May 25, 1943.  E. P. ZELNIS  2,320,162

AIR VALVE

Filed Aug. 2, 1940

Inventor.
Edward P. Zelnis.
by Parker & Carter
Attorneys.

Patented May 25, 1943

2,320,162

UNITED STATES PATENT OFFICE 2,320,162

AIR VALVE

Edward P. Zelnis, Chicago, Ill., assignor to The Dole Valve Company, Chicago, Ill., a corporation of Illinois Application August 2, 1940, Serial No. 350,035

5 Claims. (Cl. 137—122)

This invention relates to air valves and has for its object to provide a new and improved device of this description.

The invention has as a further object to provide an air valve which prevents spitting through the air vent when in operation. The invention has as a further object to provide an air valve with a float arranged so that the float closes off the air vent before the water in the casing rises to a point where spitting can occur through the air vent. The invention has as a further object to provide an air valve with a float wherein the air vent is closed more rapidly than with air valves now in use.

The invention has as a further object to provide an air valve arranged so that the float is steady and oscillation of the float is minimized. The invention has as a further object to provide an air valve which is quiet in operation.

The invention has as a further object to provide an air valve with a casing having at its lower end a water receptacle and a float having its lower end projecting down into this water receptacle, so that the float is partially immersed when the air valve is in use.

The invention has further objects which are more particularly pointed out in the accompanying description.

Referring now to the drawing, Fig. 1 is a vertical sectional view through one form of air valve embodying the invention;

Like numerals refer to like parts throughout the several figures.

Figure 3:
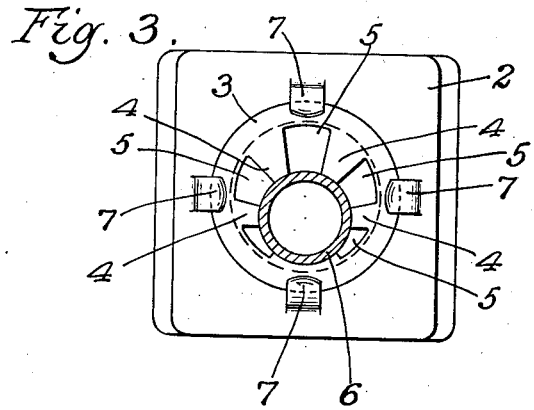
Fig. 3 is an enlarged view of the inner face of the nipple and other parts, with the drain pipe in section.
Figure 1:
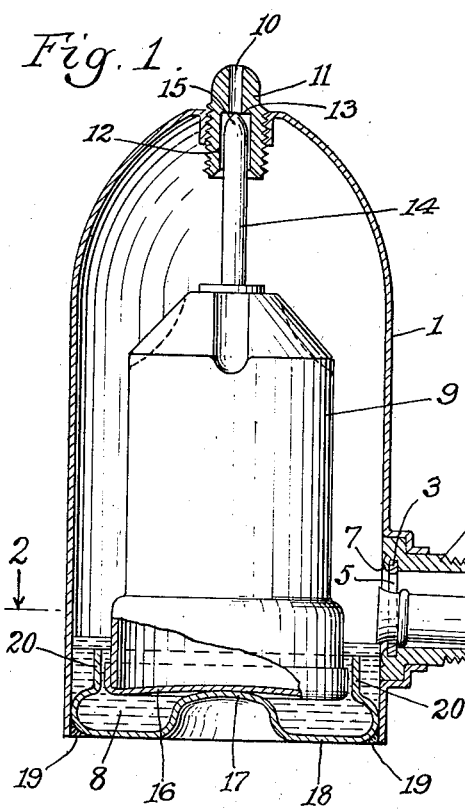
Figure 2:
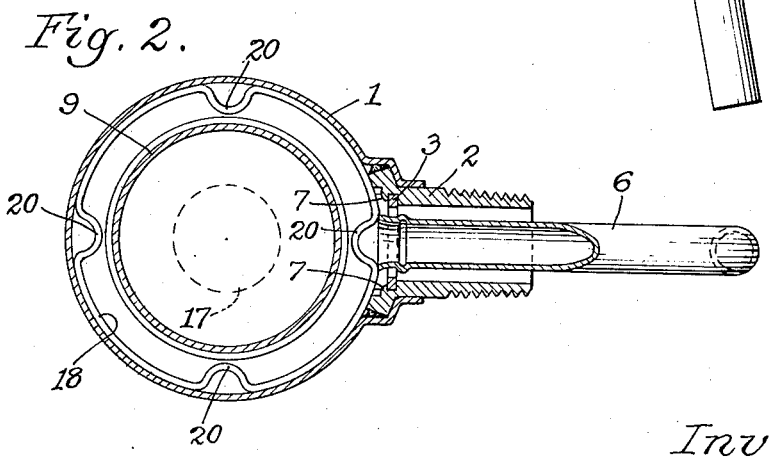
Fig. 2 is a sectional view taken on line 2—2 of Fig. 1.

In this construction the air valve has a casing 1 having an opening through which material enters, such as steam and water, and through which the water is drained back into the radiator. A nipple 2 is fastened to the casing, so that this opening passes through the nipple. The nipple is screwthreaded for connection to the radiator. Within the nipple is a member 3 which has a series of projections 4, separated by spaces 5 and projecting inwardly to engage the drain pipe 6. These projections are longer at the top so that the drain pipe 6 is located eccentrically with relation to the member 3 so that the steam will enter the casing above the drain pipe, but not below it, at its lower portion. The member 3 is held in position in any desired manner, as by the holding pieces 7 which are preferably integral with the nipple 2 and are bent so as to project past the member 3 after the member is placed in position. The bottom portion of the casing 1 projects down below the lower face of the opening through which the water drains out of the casing, so as to form a water receptacle 8 which contains water when the valve is in use and the system operating.

Within the casing is a float 9 which consists of a hollow receptacle and which also has expansible fluid in it, which expands when the float is heated by the steam entering the casing 1. The casing 1 is provided with an air vent opening 10 which is preferably provided with an adjustable member 11 which is threaded into the casing. There is an enlarged opening 12 in the lower end of the member 11 and a seat 13 at the end of the vent opening 10. The float 9 is provided with a stem 14 which projects into the enlarged opening 12 of the member 11 and which is preferably only slightly less in diameter than the diameter of the opening, so that oscillation of the float is minimized. The stem 14 has at its end a valve member 15 adapted to seat on the valve seat 13 and close the vent opening when the float is lifted by water in the valve casing, or when the expansible material therein is expanded by the heat of the steam.

The end of the float projects down into the water chamber 8 so that its lower end will always be submerged in water when the steam system with which the valve is used is in operation. The end wall 16 is preferably thin and rests upon a support 17 so that when the expansible material in the float expands, the stem 14 will be lifted to cause the valve member 15 to engage the seat 13 and close the vent opening.

The lower end of the casing 1 may be closed in any desired manner. For simplicity of construction I prefer to provide a bottom piece 18 which is separate from the casing, but which completely closes the end and which is sealed at 19 by soldering, brazing, or in any other manner. The bottom piece 18 projects upwardly into the casing and is preferably provided with guiding members 20, which are in proximity to the lower end of the float and minimize the oscillation of its lower end. These guiding members are preferably made by bending the upturned edge of the bottom piece 18. The support 17 is preferably integral with the bottom 18 and it simply consists of an upwardly bent portion of this bottom.

I have described in detail a particular construction embodying the invention, but it is of course evident that the parts may be varied in many particulars without departing from the spirit of the invention as embodied in the claims hereto appended.

The use and operation of my invention are as follows:

When the system with which the air valve is used, is in operation, steam enters the casing 1 and the casing being cold, the steam condenses and forms water and with the valves now in use, some of this water is ejected through the vent opening 10 into the room, which is very objectionable. The present valve prevents this. In this valve, when the water condenses in the casing it passes to the bottom of the casing so as to fill the water chamber 8. After this water chamber is filled, additional water is formed by condensation of the steam, or is injected into the casing from the system, and this additional water causes the level of the water in the water chamber to rise so that the float 9 is lifted to close the air vent 10.

The water chamber 8 at the bottom of the casing 1 is of such a depth that the float 9 is partially submerged at all times in water when the heating system with which the valve is used is in operation. The depth of this water receptacle is preferably such that the float 9 will be moved upwardly when a comparatively small amount of additional water is in the casing 1, so that the float lifts to close the vent opening 10 before the water level reaches any considerable height in the casing, that is before the water level reaches such a height that some of the water may be ejected through the air vent 10 and out into the room, thus causing spitting of the valve. It will be seen that by regulating the depth of the water receptacle 8, it will be an easy matter to insure a proper height of the water level to prevent spitting, that is prevent water from being ejected through the vent opening 10 before the vent opening is closed by the float. In this construction it will be noted that the float is guided at its lower end and by means of the stem 14 at its upper end, so that its oscillation is minimized. This construction also provides a more quiet valve when the system is in operation. The construction herein shown, by closing the lower end of the casing, also provides an effective means of guiding the lower end of the float and also a cheap and effective construction. With this device the air vent closes much sooner after the steam begins to condense in the valve casing than with other valves now in use, thereby preventing the water rising high enough to spit before the float closes the vent opening.

It will be seen that I have here an air valve with a float, the float at all times being semi-buoyant while the system with which the valve is connected is in operation.

I claim:

1. An air valve comprising a casing having an air vent at one end, a separate sheet metal bottom member at the other end, one face of which forms the exterior face of the bottom of the casing and which acts as the closing member for the bottom of the casing, said member located on the interior of the casing and having a central part which projects inwardly into the casing and an outer peripheral part integral with the central projecting part which projects inwardly into the casing to a greater extent than the central part, and a float in the casing, which normally rests on said central projecting part, the lower end of the float projecting into and being confined within said peripheral projecting part.

2. An air valve comprising a casing having an air vent at one end, a separate bottom member at the other end, which closes said end, one face of which forms the exterior face of the bottom of the casing and which has a central part which projects inwardly into the casing and an outer peripheral part which projects inwardly into the casing to a greater extent than the central part, and a float in the casing, which normally rests on said central projecting part, the lower end of the float being confined within said peripheral projecting part, said peripheral projecting part having inwardly bent guiding portions extending longitudinally therealong which extend into proximity to the float and act to guide the float in its up and down movement.

3. An air valve comprising a casing having an air vent at one end, a separate sheet metal bottom member at the other end, which forms the exterior bottom closure for the bottom of the casing and which has a central part which projects inwardly into the casing and an outer peripheral part integral with the central projecting part which projects inwardly into the casing to a greater extent than the central part, and a float in the casing, which projects into and normally rests on said central projecting part, said outer peripheral part projecting inwardly into the casing and overlapping the lower end of the float, a space being provided between the central projecting part and the outer peripheral part which acts as a permanent water receiving chamber when the air valve is in use, the lower end of the float being confined within said peripheral projecting part, which acts as a guide for said float, said bottom member acting as a water chamber, the lower end of the float being immersed in the water in this chamber at all times while the air valve is in use.

4. An air vent comprising a casing, an adjustable member mounted in said casing and having an air passageway therethrough forming an air vent, the lower portion of which is of larger diameter than the upper portion, a float in the casing, a separate bottom having a central inwardly projecting portion and a peripheral part which projects inwardly, said bottom forming a support for the float and a guide for the float, and a receptacle for water into which the end of the float projects, and an elongated stem connected with said float, the upper end of which projects into said opening of larger diameter and in proximity to the end of the opening of smaller diameter, said stem being moved to close said air vent when the water in the casing rises above the top of the water chamber, said separate bottom forming the exterior bottom member of the air valve.

5. An air valve comprising a sheet metal casing open at the bottom, having an air vent at the top and a steam admission opening near the bottom, a bottom member which completes the casing and which has a central part which projects inwardly into the casing and an outer peripheral part which projects inwardly into the casing, one face of the bottom member forming the exterior face of the bottom of the casing, a float in the casing guided by said inwardly projecting peripheral part and normally resting on the central projecting part for controlling said air vent, said bottom part also acting as a permanent water receptacle when the air valve is in use.

EDWARD P. ZELNIS.